No. 767,834. PATENTED AUG. 16, 1904.
F. J. PIOCH.
STOVE.
APPLICATION FILED NOV. 7, 1903.
NO MODEL. 2 SHEETS—SHEET 1.
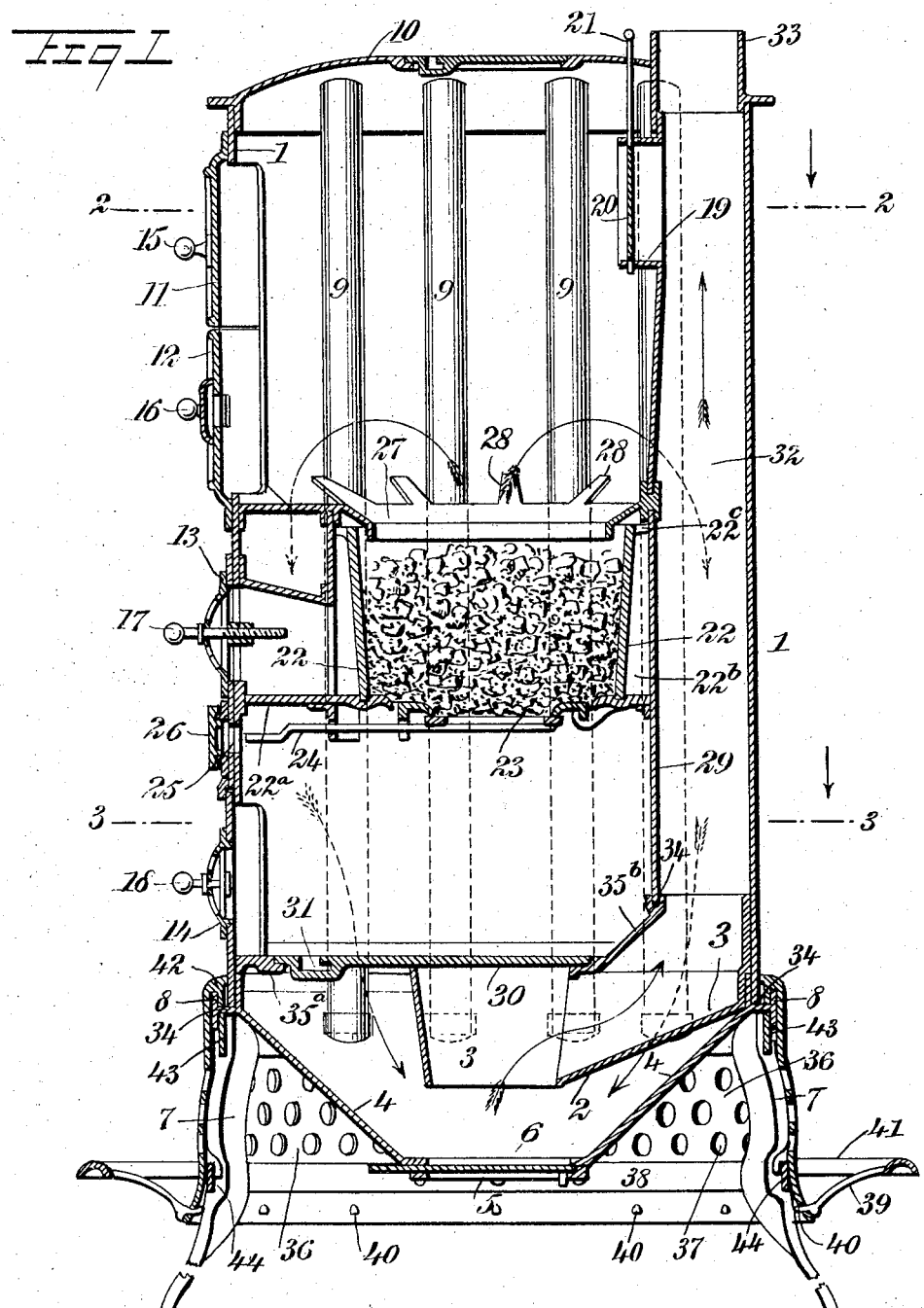

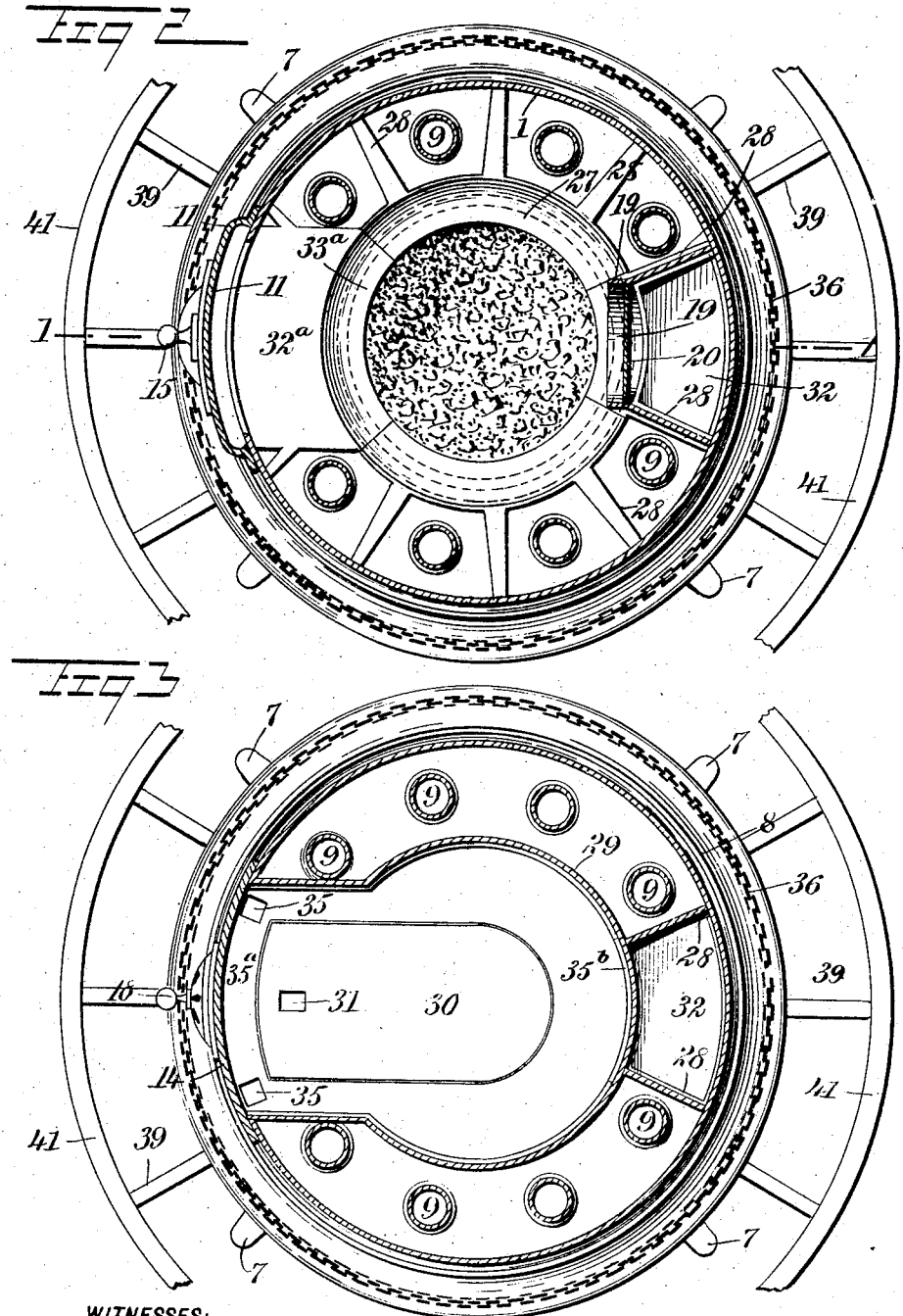

No. 767,834.

Patented August 16, 1904.

UNITED STATES PATENT OFFICE.

FRANK J. PIOCH, OF PROVO CITY, UTAH.

STOVE.

SPECIFICATION forming part of Letters Patent No. 767,834, dated August 16, 1904.

Application filed November 7, 1903. Serial No. 180,206. (No model.)

*To all whom it may concern:*

Be it known that I, FRANK J. PIOCH, a citizen of the United States, and a resident of Provo City, in the county of Utah and State of Utah, have invented new and useful Improvements in Stoves, of which the following is a full, clear, and exact description.

My invention relates to stoves, my more particular object being to produce an efficient, reliable, and economical stove having a downdraft.

My present invention constitutes certain improvements over my other invention described in my application, Serial No. 145,312, filed February 27, 1903.

Reference is to be had to the accompanying drawings, forming a part of this specification, in which similar characters of reference indicate corresponding parts in all the figures.

Figure 1 is a vertical central section of a stove embodying my invention upon the line 1 1 of Fig. 2. Fig. 2 is a horizontal section upon the line 2 2 of Fig. 1 looking in the direction of the arrow, and Fig. 3 is a horizontal section upon the line 3 3 of Fig. 1 looking in the direction of the arrow.

An outer shell 1 is provided with a false bottom 2, having a central opening 3, these parts being partially encircled by a substantially conical base 4. This base is provided with a central opening 5 and with a manually-operated slide 6. The stove rests upon legs 7 in the usual manner, and these legs may be of any desired form. A ring 8 supports the skirt 36, as hereinafter described.

The ventilating-pipes are shown at 9 and pass through the top 10 of the stove and also through the conical base 4. The stove is provided with doors 11, 12, 13, and 14, which may be of any desired form and provided with knobs 15 16 17 18. These doors form no part of my present invention, and I do not limit myself to the use of doors of any particular kind. A draft-tube 19 is provided for allowing egress of the gases of combustion and is provided with a damper 20, controlled by means of a handle 21, whereby any desired degree of curtailment of the gases may be effected.

The fire-pot is shown at 22 and at its bottom $22^a$ is provided with a movable grate-pan 23, which is controlled by means of a handle 24, the fire-pot being encircled by an annular space $22^b$. In order to make the handle accessible, an opening 25, normally closed by a cap 26, is provided. Disposed above the fire-pot is a conical ring 27, provided with radially-disposed stays 28. The outer ends of the stays 28 engage the outer shell 1, the stays thus forming bridges between the inner shell 29 and the outer shell 1. The gases of combustion from the fire-pot are free to pass downward between the stays 28 and also between the ventilating-pipes 9 in the direction indicated by the arrows. A lift-plate 30 is provided in the bottom of the inner shell 29 and is provided with an aperture 31 to be engaged by a lifter. A flue 32 leads upwardly from the base of the stove at one side of the shell 1, and upon the neck 33 at the top of said passage a stovepipe may be secured in the usual manner.

The inner shell 29 rests in cup-joints 34, which afford a secure and strong fastening. The apertures 35 in the bottom plate $35^a$, on which plate the lift-plate 30 rests, are for the purpose of affording room for any hinges and fastening devices which may be employed upon the doors, and the annular space $22^b$ encircling the fire-pot is for the purpose of feeding hot air into the top of the fire-pot and at the same time to protect the shell 29 against excessive heat.

The bottom 4 is encircled by a hoop-like member 8, integrally mounted upon a flange at the cup-joints 34, as shown more particularly in Fig. 1. The hoop-like member 8 and the flange just mentioned present in cross-section the appearance of a T. The purpose of this arrangement is to space the hoop-like member 8 slightly from the outer shell 1, so as to allow for mounting the ornamental skirt 36, which is provided with apertures 37 to allow the passage of air through the skirt. The space between the hoop-like member 8 and the outer shell 1 also serves to make room for any bolts or other fastenings which may be used in holding the structure together. Below the flange on which the hoop-like member 8 is formed is another hoop 43, connected with the legs 7 and serving as an annular support, whereby a considerable portion of the weight of the stove is sustained. A foot-rest 41 is mounted upon brackets 39, each bracket having an anchor 40 passing radially through the lower end of the skirt 36, as shown more particularly in Fig. 1. The skirt 36 is provided at its upper portion with an annular flange 42, bending downwardly and inwardly, as shown. This flange 42 serves to hook over the hoop-like member 8, so that the skirt 36 depends therefrom, and thus supports the foot-rest 41. A hoop 44 is also attached to the legs 7, as shown in Fig. 1.

The warm air passing around the conical portion 4 of the stove spreads radially outward through the aperture 37 and is thus used for warming the feet of persons engaging the foot-rest 41.

It will be observed that the hoops 43 and 44 are connected with the legs 7 of the stove, and thus form a foot upon which the weight of the stove rests, whereas the skirt 36 hangs over the hoop-like member 8. By this arrangement no bolts need be used in connecting the stove with its footing. By means of the skirt 36 a comely and attractive appearance is given to the entire lower portion of the stove independently of the effect of the skirt 36 in warming the feet of persons while the stove is in use.

While I preferably employ the skirt and footing above described, I do not limit myself to this particular construction.

It will be noted that with the several parts of the stove as above shown and described the inside work of the stove is supported so as to have considerable strength.

The object of the annular space $22^b$ between the fire-pot 22 and the inner shell 29 is to allow air to circulate around the fire-pot and prevent injury to the same from the intense heat. The air in this space $22^b$ in thus absorbing heat from the fire-pot and preventing injury thereto becomes itself heated to a very high temperature and passes upwardly through the narrow openings $22^c$ above the space $22^b$, curling inwardly and downwardly, so as to pass beneath the hot-blast ring radially toward the center of the fire-pot. In other words, the hot air simply flows in a curved path inwardly over the edge of the fire-pot and passes radially toward the center of the same in immediate contact with the burning fuel. In doing this the hot air crowds very closely to the mouth of the fire-pot, and this fact, together with its close proximity to the fuel, causes it to become heated to a higher temperature. The air thus heated having passed downwardly into the fire-pot consumes all, or at least a great part, of the smoke and gases which may be arising from the fuel, and this feature is in the line of economy of fuel as well as of thorough heating.

The hot-blast ring 27 or "safety-grate," as it is sometimes called, answers four different purposes, to wit:

First. It directs the heated air from the space $22^b$ down over the rough fire, so as to burn the gas and smoke, as above stated. Unless this step were accomplished not only would the smoke and gas be wasted, but they might become a nuisance after making their escape.

Second. The hot-blast ring serves as a covering or roof over the space encircling the upper edge of the fire-pot. In doing this it prevents ashes and small pieces of coal from falling into the space $22^b$, encircling the fire-pot.

Third. The radial members 28 to some extent prevent pieces of coal fed to the fire from falling into the space encircling the inner shell 29.

Fourth. The radial members 28 serve as braces, and thereby strengthen the stove.

It will be noted that air passing upward through the passage 32 is drawn from a point directly in the center of the base. There is, therefore, no so-called "short run," the distance between the several parts being so proportioned that the stove is heated all around. In other words, the structure of the stove is such that the flames and hot gases are forced to travel routes of such proportionate length as to clearly distribute their heat and prevent one part of the stove from becoming exclusively hot as compared with another part.

The feed-door opening of the stove is made very large. The reason for this is that the fire-pot 22, if broken or damaged, may be lifted bodily through the feed-door opening and taken out of the stove, so as to be replaced by another. In order to facilitate the removal of the fire-pot, I do not limit myself to a fire-pot made in a single piece; but I may employ fire-pots of other kinds, if desired.

The operation of my device is as follows: A fire having been made in the fire-pot 22, the gases of combustion pass over the end of the fire-pot and immediately between the stays 28, passing downward and circulating around the ventilating-pipes 9, heating the same thoroughly. The gases of combustion next pass into the space 4 and are thence drawn upward through the flue 32, this flue being formed by the partitions 28 28, the inner shell 29, and the outer shell 1, as will be seen from Fig. 3. It will be noted that the updraft-flue thus formed is entirely within the stove, being encircled by the outer shell 1. The air within the ventilating-pipes 9 being heated passes upward, and cold air is constantly drawn in the bottom ends of these ventilating-pipes.

While I preferably employ the ventilator-tubes 9, I wish it to be understood that I do not limit myself to this construction.

Having thus described my invention, I claim as new and desire to secure by Letters Patent—

1. In a stove, the combination of a footing, and a skirt of annular form encircling said footing and depending therefrom, said skirt being provided with means for permitting hot air to pass therethrough, and a foot-rest disposed adjacent to said skirt.

2. In a stove, the combination of inner and outer shells, means for producing a revertible draft between said inner and outer shells, a substantially conical member connected with said outer shell and disposed at the lower end thereof, and means for compelling a draft from the center of said substantially conical member to a point of discharge for the smoke and gases.

3. In a stove, the combination of an outer shell and an inner shell, a plurality of partitions each connected with said inner shell and said outer shell, two of said partitions being spaced asunder and forming an updraft-flue intermediate of said inner and said outer shells, a fire-pot disposed within said inner shell, the arrangement being such that the gases of combustion from said fire-pot are free to pass downwardly intermediate of said shells, and then to pass upwardly through said flue, and a plurality of ventilator-tubes located intermediate of said shells and thus exposed to a revertible draft.

4. In a stove, the combination of a footing provided at its top with an annular member, an ornamental skirt provided with perforations and with an orifice for engaging said annular member, said skirt depending from said annular member, and a foot-rest disposed within the path of air passing through said perforations.

5. In a stove, the combination of stove-legs, annular members connecting the same together and forming therewith a footing, a shell mounted upon said footing, a skirt connected with said footing and depending therefrom, said skirt being provided with perforations, and a foot-rest disposed within the path of air passing through said perforations.

6. In a stove, the combination of a body portion, a footing for supporting the same, a metallic skirt of annular form provided with means for permitting air to pass therethrough, and also provided adjacent to one of its edges with an annular flange for encircling said footing, and a foot-rest connected with the lower portion of said skirt and supported thereby.

In testimony whereof I have signed my name to this specification in the presence of two subscribing witnesses.

FRANK J. PIOCH.

Witnesses:
  S. E. CASSITY,
  V. V. BOTT.